United States Patent [19]

Masumoto

[11] Patent Number: 4,660,165

[45] Date of Patent: Apr. 21, 1987

[54] PYRAMID CARRY ADDER CIRCUIT

[75] Inventor: Rodney T. Masumoto, San Diego, Calif.

[73] Assignee: TRW Inc., Redondo Beach, Calif.

[21] Appl. No.: 596,485

[22] Filed: Apr. 3, 1984

[51] Int. Cl.[4] .............................................. G06F 7/50
[52] U.S. Cl. ................................................... 364/787
[58] Field of Search ........................................ 364/787

[56] References Cited

U.S. PATENT DOCUMENTS

| | | | |
|---|---|---|---|
| 3,566,098 | 2/1970 | Kono | 364/787 |
| 3,697,735 | 10/1972 | Hanson | 364/787 |
| 3,700,875 | 10/1972 | Saenger et al. | 364/787 |
| 3,925,652 | 12/1975 | Miller | 364/787 |

OTHER PUBLICATIONS

Willette et al, "Binary Adder" *IBM Tech. Disclosure Bulletin*, vol. 6, No. 4 Sep. 1963, pp. 39–40.
Wade, "Binary Adder with Quaternary Lookahead", *IBM Tech. Disclosure Bulletin*, vol. 7, No. 11, Apr. 1965, pp. 1006–1008.

*Primary Examiner*—David H. Malzahn
*Attorney, Agent, or Firm*—Noel F. Heal; Robert M. Wallace

[57] ABSTRACT

A digital adder circuit using principles similar to a pyramid carry adder, but with the ability to assimilate intermediate carry bits more rapidly. The circuit includes at least one adder stage for receiving multiple intermediate sum bits and multiple intermediate carry bits as inputs, and reducing the number of carry bits by a factor of at least three. The adder stage as disclosed is implemented in the form of current-mode logic. Preferably, a first adder stage includes multiple two-bit adder circuits, also in the form of current-mode logic, each two-bit adder circuit producing as outputs two sum bits and a carry bit.

6 Claims, 8 Drawing Figures

Fig. 8 the pyramid carry type, in which the number of stages of addition is reduced further below that provided by the basic pyramid scheme for carry clearing. In particular, the adder circuit of the invention includes, in at least one of its stages, means for reducing the number of carry bits by a factor of at least three, as opposed to the factor of two in the basic pyramid scheme for carry clearing.

PYRAMID CARRY ADDER CIRCUIT

BACKGROUND OF THE INVENTION

This invention relates generally to binary adder circuits, and more particularly, to adder circuits employing some type of parallel structure to handle generated carry bits without a conventional "ripple" carry computation. When two binary numbers are added together, the summation at each bit position produces a sum bit and a carry bit, each of which may be a "1" or a "0". The conventional addition process, whether in binary or decimal notation, involves a series of additions beginning at the right-hand or least-significant ends of the numbers. At the first stage, the two digits are added to produce a sum digit and a possible carry digit. Then, at each succeeding digital stage two digits are added together with the carry digit, if any, from the preceeding stage. This is known as a "ripple" addition process, since a carry digit may propagate from one end of the sum to the other, and each digit of the sum may not be determined until all of the preceeding digits of lesser significance have been determined.

The delay time inherent in performing ripple addition is proportional to the number of stages. Identical adder modules, each having a delay time t, may be used to process each addition stage, and the total processing time will therefore be given by nt, where n is the number of stages to be added. Thus, for example, a 32-bit addition will take twice as long as a 16-bit addition.

It has long been recognized that some form of parallel processing is desirable for high-speed addition circuitry. A process known as pyramid carry addition was described in principle by Morton Nadler in "A High-Speed Electronic Arithmetic Unit for Automatic Computing Machines," Acta Technica (of the Czechoslovak Academy of Science) (1956) pp. 464–78. In accordance with this technique, two n-bit binary numbers to be added are first added in a parallel but bit-by-bit basis by n separate adder modules, to generate n first-stage sum bits and n separate carry bits. In a second stage of the process, each of n/2 identical modules processes two sum bits and two carry bits, producing two second-stage sum bits and a single carry bit. In this manner, the second stage of the addition process reduces the number of carry bits by a factor of two.

Similarly, in third and subsequent stages the number of carry bits is successively reduced by a factor of two, until the final sum is obtained with only one remaining carry bit at the most-significant end. If each stage can be implemented in such a way as to have the same inherent delay time, the total delay time will be proportional to the number of stages, which will be $\log_2 n$ for values of n that are powers of two. Clearly the pyramid carry adder represents a substantial advance over ripple carry techniques. However, in some applications of adder circuitry, such as in floating point multiplication, even greater improvements in speed are desired. Accordingly, there is still room for improvement over the basic pyramid carry adder, and the present invention is directed to this end.

SUMMARY OF THE INVENTION

The present invention resides in an adder circuit of the pyramid carry type, in which the number of stages of addition is reduced further below that provided by the basic pyramid scheme for carry clearing. In particular, the adder circuit of the invention includes, in at least one of its stages, means for reducing the number of carry bits by a factor of at least three, as opposed to the factor of two in the basic pyramid scheme for carry clearing.

In accordance with one aspect of the invention, the first stage of addition employs a plurality of two-bit adder modules, each generating a pair of sum bits and one carry bit. In a second stage, the outputs of these two-bit adder modules are processed in parallel in multi-bit adder modules, each of which is capable of receiving carry outputs from s two-bit adder modules, where s is at least three, and producing a new intermediate sum output and only one carry bit. In other words, all but one of the s carry inputs is assimilated or cleared in each module of the second stage. Depending on the speed design goals for the circuit and the number of binary stages of significance in the numbers to be added, the third and subsequent stages may either include additional modules capable of a further s-to-1 carry bit clearing, or a conventional pyramid adder stage with 2-to-1 carry clearing ability, or even a conventional ripple carry clearing stage.

The speed advantage gained by use of this technique will depend on the number stages employing the s-to-1 carry reduction principle, the number of bits of significance to be added, and so forth. Since each stage effects a reduction in carry bits by a factor of s, the number of such stages to reduce the number of carry bits from n to one is $\log_s n$, assuming that n is a power of s. If there is a first stage of two-bit adders, the total number of stages is $\log_s(n/2)+1$, assuming that n/2 is a power of s. For example, if s is four, i.e. each stage can result in the clearing of three of four carries, an intermediate sum having 64 sum bits and carry bits can be reduced to a final sum and one carry bit in three stages, ($\log_4 64$). Thus the number of delay times for adding words of 128 bits is four. This compares favorably with the seven delay times of a conventional pyramid carry adder.

The rate at which carry bits can be assimilated by adder modules in the present invention will depend largely on the type of circuit logic or technology employed in the detailed design. One technology that lends itself to the technique of the invention is current-mode logic (CML). Accordingly, in one specific embodiment of the invention the adder modules used for carry assimilation are implemented in current-mode logic. The number of stack positions that the CML circuitry can accommodate will determine the number of carries that can be assimilated at each stage of the adder. At the present state of CML technology, sufficient stack positions can be provided to assimilate two or three carry bits at each stage, i.e. a carry assimilation ratio of 3-to-1 or 4-to-1.

CML circuitry can also be usefully employed in a first stage of the adder, having multiple two-bit adder modules, although the invention is not necessarily limited to the use of CML in this stage. The only requirement for such a first stage is that the output sum and carry signals be at appropriate voltage levels to match the circuitry of the second stage. The use of CML in the first stage is the simplest way of meeting this requirement.

Although the invention is illustrated in CML circuitry, it will be understood that other forms of circuit logic may meet the requirements of the invention. The basic requirement is that the circuitry be able to process the requisite adder module for carry assimilation in a single gate delay time. CML meets the requirement with its ability to stack logic gates, using different voltages at the different stack levels, and thereby providing outputs in a single gate delay time, which would otherwise need multiple gate delays if more conventional logic were employed. CML is not necessarily unique in this regard, however. Emitter-coupled logic (ECL), which is closely related to CML, also permits multiple logic stacks of a similar nature.

It will be appreciated from the foregoing that the present invention represents a significant advance in the field of high-speed adder circuitry. In particular, the invention provides a speed advantage over pyramid carry adders of the prior art, in that carry bits may be assimilated by a ratio of at least three-to-one in each adder stage, as compared with only two-to-one in the prior art. Other aspects and advantages will become apparent from the following more detailed description, taken in conjunction with the accompanying drawings.

DESCRIPTION OF THE PREFERRED EMBODIMENT

As shown in the drawings for purposes of illustration, the present invention is concerned with pyramid carry adder circuits. Pyramid carry adders have in the past been characterized, and limited, by the assimilation of carry bits in a ratio of two-to-one at each stage of computation. In other words, the number of carry bits is reduced by one-half at each computational stage. If the computational stages each take a single gate delay time, the total computation time is greatly reduced in comparison to a traditional ripple-carry addition operation.

In accordance with the present invention, at least one computational stage of a pyramid carry adder circuit provides carry assimilation at a ratio of at least three to one. This provides a further speed advantage over pyramid carry adders of the prior art.

Figure 1:
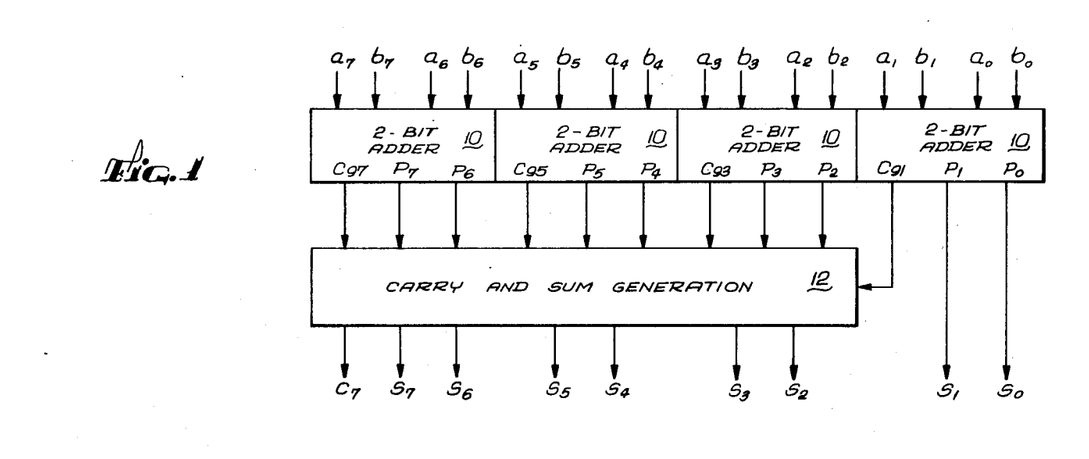
FIG. 1 is a block diagram of an 8-bit adder in accordance with the invention, providing a four-to-one carry assimilation ratio in the second stage.

FIG. 1 illustrates one form of the invention employing a four-to-one carry assimilation in the second stage of computation of an eight-bit addition. In a first computational stage, four two-bit adders, indicated by reference numeral 10, are employed to process two eight-bit numbers to be added together, indicated by $a_0$–$a_7$ and $b_0$–$b_7$, respectively. Each of the adders 10 performs a two-bit addition operation and generates two sum bits, indicated by $P_0$ and $P_1$, $P_2$ and $P_3$, $P_4$ and $P_5$, and $P_6$ and $P_7$. Each adder 10 also generates a single carry bit, indicated by $C_{g1}$, $C_{g3}$, $C_{g5}$ and $C_{g7}$.

In a second stage of computation, three of the four carry bits are assimilated in carry and sum generation logic 12. The logic 12 receives as inputs all four carry bits from the first stage adders 10, and the sum bits $P_2$ through $P_7$ from three of the four first-stage adders 10. The logic 12 generates as outputs a single carry bit $C_7$ and six sum bits $S_2$–$S_7$. The remaining two sum bits $S_0$ and $S_1$ are derived directly from the outputs $P_0$ and $P_1$ of the least significant two-bit adder 10.

Figure 2:
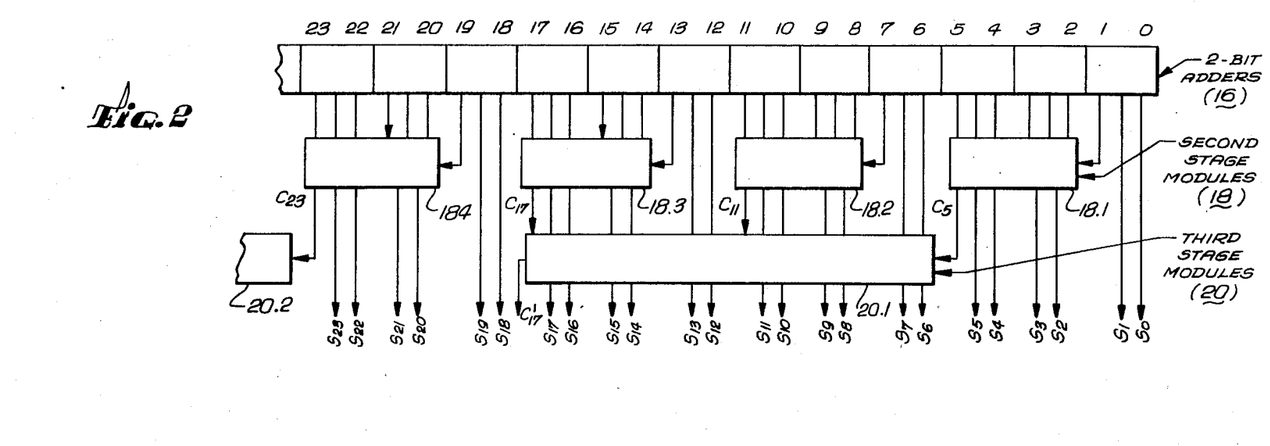
FIG. 2 is a fragmentary block diagram showing the first three stages and twenty-four bits of an adder providing a three-to-one carry assimilation ratio in accordance with the invention.

FIG. 2 illustrates another form of the invention, in which carry bits are assimilated in a ratio of three-to-one. The first stage of computation is again illustrated as including a plurality of two-bit adders 16. As in the FIG. 1 example, each of the two-bit adders 16 produces two sum bits and one carry bit. In the second computational stage, a plurality of second-stage modules 18 further processes the outputs from the adders 16. Specifically, each second-stage module 18 receives four sum bits from two two-bit adders 16, and three carry bits from three two-bit adders.

The two least-significant bits, from the least-significant two-bit adder 16, need no further processing and emerge as sum bits $S_0$ and $S_1$ of the desired result. Sum inputs at bit positions #2–#5 and carry inputs from bit positions #1, #3, and #5 are received by the least-significant second-stage module, indicated by reference numeral 18.1, which produces sum outputs $S_2$–$S_5$, which require no further processing, and a single carry output $C_5$. Sum bits from bit positions #6 and #7 and #12 and #13 of the first-stage adders 16 pass through the second stage of computation without processing and are input to a third-stage module 20.

The next most significant second-stage module, indicated by 18.2, receives sum inputs at bit positions #8–#11 and carry inputs from bit positions #7, #9, and #11. Output intermediate sum bits are produced at bit positions #8–#11 and a carry bit $C_{11}$ is generated. Similarly, second-stage module 18.3 provides intermediate sum bits at bit positions #14–#17 and a carry bit $C_{17}$. As also shown, the next most significant second-stage module 18.4 produces sum outputs $S_{20}$–$S_{23}$ and a carry output $C_{23}$. In the third-stage module 20.1, sum bits $S_6$–$S_{17}$ are generated and the three carry bits $C_5$, $C_{11}$ and $C_{17}$ from second-stage modules 18.1, 18.2 and 18.3 are combined to produce a single carry output from bit position #17, indicated at $C'_{17}$.

Depending on the length of the numbers to be added, the design speed goals for the circuit, and other factors, additional computational stages beyond the third stage may employ additional three-to-one carry assimilations, or may employ more traditional pyramid-carry or ripple-carry techniques. So that the invention may be fully understood, the details of implementation of the two-bit adders 16 and the second-stage modules 18 will now be discussed in more detail.

The function of each of the two-bit adders 16 is to produce two sum bits and a carry bit from a pair of two-bit input numbers. The notation used here and in the figures is that the suffix A indicates the least-significant digit and the suffix B indicates the most-significant digit of the two-digit quantities being processed. One input quantity is referred to by prefix S and the other by prefix C. Thus, the two input numbers are SB, SA and CB, CA. The output sum bits are TSB and TSA, and the output carry bit is TCB. The truth table for the required two-bit addition is as follows:

| SB | SA | CB | CA | TSB | TSA | TCB |
|---|---|---|---|---|---|---|
| 0 | 0 | 0 | 0 | 0 | 0 | 0 |
| 0 | 0 | 0 | 1 | 0 | 1 | 0 |
| 0 | 0 | 1 | 0 | 1 | 0 | 0 |
| 0 | 0 | 1 | 1 | 1 | 1 | 0 |
| 0 | 1 | 0 | 0 | 0 | 1 | 0 |
| 0 | 1 | 0 | 1 | 1 | 0 | 0 |
| 0 | 1 | 1 | 0 | 1 | 1 | 0 |
| 0 | 1 | 1 | 1 | 0 | 0 | 1 |
| 1 | 0 | 0 | 0 | 1 | 0 | 0 |
| 1 | 0 | 0 | 1 | 1 | 1 | 0 |
| 1 | 0 | 1 | 0 | 0 | 0 | 1 |
| 1 | 0 | 1 | 1 | 0 | 1 | 1 |
| 1 | 1 | 0 | 0 | 1 | 1 | 0 |
| 1 | 1 | 0 | 1 | 0 | 0 | 1 |
| 1 | 1 | 1 | 0 | 0 | 1 | 1 |
| 1 | 1 | 1 | 1 | 1 | 0 | 1 |

An important consequence of the truth table is that an output in the form 111 is impossible. This facilitates processing in a subsequent computational stage. The corresponding logic equations are as follows:

$$TSA = SA \oplus CA$$

$$TSB = (SA.CA) \oplus SB \oplus CB$$

$$TCB = [(SA.CA).(SB \oplus CB)] + [(SB \oplus CB)/.CB]$$

Figure 3:
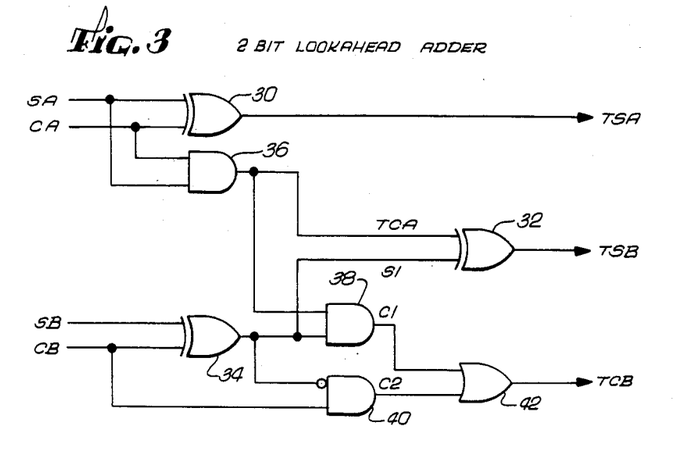
FIG. 3 is a logic diagram of a two-bit look-ahead adder of the type used in the first stage of the circuits of FIGS. 1 and 2.

FIG. 3 shows the logic diagram corresponding the logic equations and the truth table given above. The logic includes three exclusive OR (XOR) gates 30, 32, 34, three AND gates 36, 38 and 40, and an OR gate 42. The XOR gate 30 combines the two first-bit inputs SA and CA to provide output signal TSA. AND gate 36 combines the same two input signals to produce a first-bit carry signal TCA, which is input to XOR gate 32. XOR gate 34 combines second-bit inputs SB and CB, to produce an intermediate second-bit sum output SI, which is combined with the first-bit carry in XOR gate 32, to produce the second-bit sum output TSB. AND gates 38 and 40, and OR gate 42 combine second-bit input signals and the first-bit carry signal TCA to generate a second-bit carry output signal TCB.

The logic diagram, equations, and truth table completely define the logic of the two-bit adders 16. Their detailed implementation is further defined by the schematic diagram of FIG. 5, which shows one of the two-bit adders implemented in current-mode logic (CML).

As is well known, current mode logic takes the form of multiple stacks of switching transistors, which are often arranged in complementary pairs. Current derived from a reference voltage VR1 flows through current generating transistors, such as Q3, Q4 and Q11. Current is steered through various levels of logic in accordance with the states of various pairs of transistors, and desired logical results are thereby derived from the circuit. For example, transistors Q24–Q32 are equivalent to the XOR gate 34 of the logic diagram (FIG. 3). Current derived from transistor Q30 will flow through Q28 if CB is a "1" or high, and through Q29 if CB is a "0" or low. Likewise, if SB is high, current will flow through either Q24 or Q27, and if SB is a low, current will flow through Q25 or Q26. Further analysis of the circuit will show that, so long as both inputs are high or both inputs are low, current will be steered through resistor R12, but if only one input is high and the other low, current will be steered through resistor R13. Since these resistors are coupled to the base terminals of transistors Q31 and Q32, transistor Q31 is switched high only when there is no current in R12, i.e. when only one of the inputs is high. This provides the requisite exclusive OR function.

Figure 5:
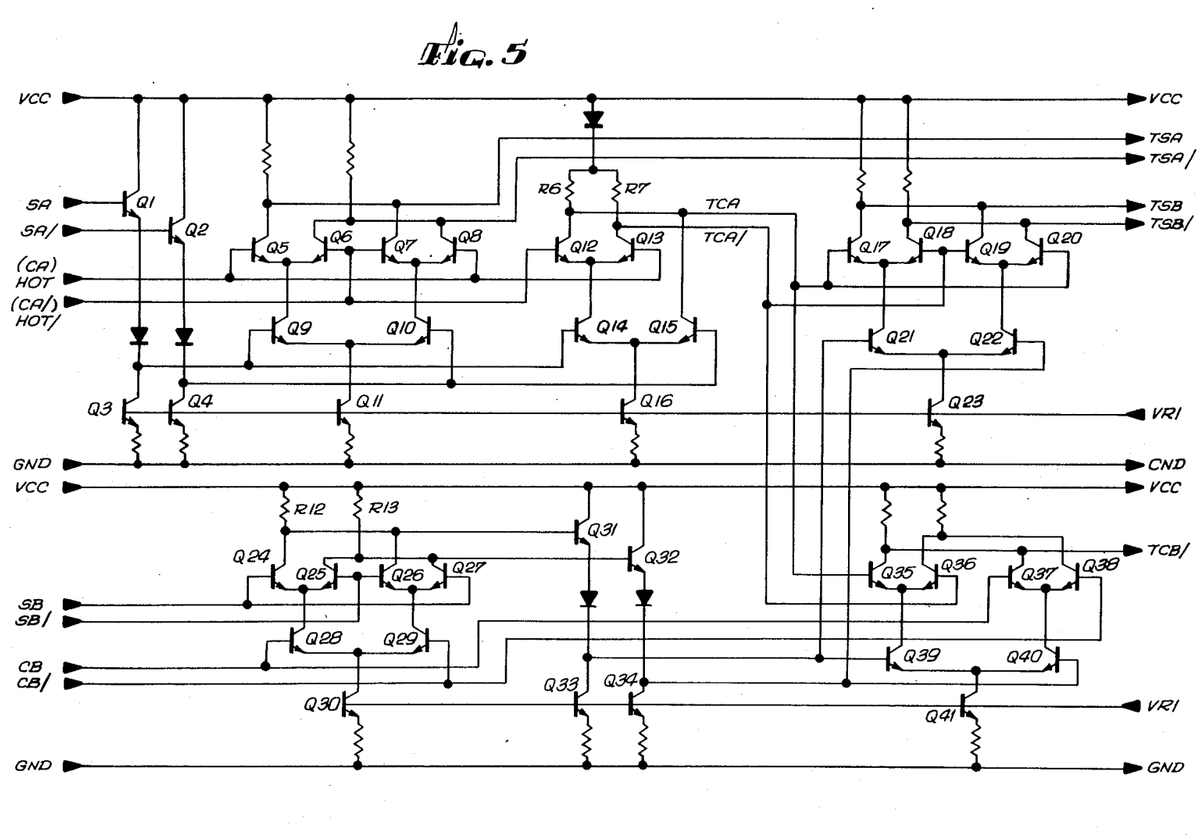
FIG. 5 is a schematic diagram of the two-bit look-ahead adder of FIG. 3.

The other logical functions of FIG. 3 are provided in a similar fashion by the CML implementation of FIG. 5. The XOR gate 30 is provided by transistors Q5–Q11, in the same manner as transistors Q24–Q30, and AND gate 36 takes the form of transistors Q12–Q16. If SA is low, the complementary signal SA/ will turn on transistor Q15, which will steer current through resistor R6 and ensure that TCA is in a low condition, regardless of the state of the other input CA. If SA is high, transistor Q14 is turned on, and current is steered through resistor R6 again only if CA is low, which turns on transistor Q12. The only condition that steers current through resistor R7 occurs when both SA and CA are high. Current then passes through transistors Q14 and Q13, and the TCA signal goes to a high condition.

Other logical elements of the FIG. 3 logic diagram are formed in a similar fashion. XOR gate 32 takes the form of transistors Q17–Q23. The remaining logic, including AND gates 38 and 40 and OR gate 42, take the form of transistors Q35–Q41, and generate the carry output signal TCB in inverted form.

Figure 4:
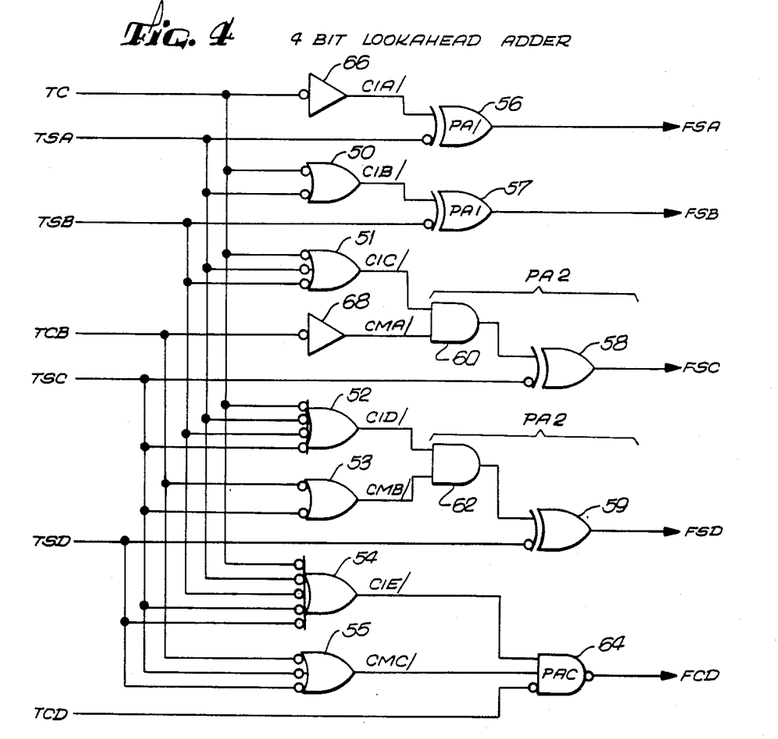
FIG. 4 is a logic diagram of a four-bit look-ahead adder of the type used as the second-stage module of the adder shown in FIG. 2.

The second-stage modules 18 are four-bit look-ahead adders, of which the logic diagram is given in FIG. 4. The inputs to each of these modules includes four sum bits, designated TSA, TSB, TSB and TSD, and three carry bits, designated TC, TCB and TCD. The outputs include four sum bits designated FSA, FSB, FSC and FSD, and a single carry bit FCD. The logic comprises six OR gates 50–55, four XOR gates 56–59, two AND gates 60 and 62, one NAND gate 64, and two inverters 66 and 68.

XOR gate 56 generates output FSA from the inverted form of the first sum input TSA and the first carry input TC, which is inverted and delayed in inverter 66 prior to input to the XOR gate 56. The inverted form of the carry signal is referred to as intermediate carry signal CIA/. XOR gate 57 provides the second sum output bit FSB, and receives as inputs the inverted form of input bit TSB and another intermediate carry signal CIB/. The XOR gates 56 and 57 are designated PA1 and their logic is separately explained in more detail below.

Output signals FSC and FSD are derived from logic elements referred to as PA2, each of which includes an XOR gate 58 or 59 and an AND gate 60 or 62. The AND gate 60 or 62 has its output coupled as an input to the XOR gate 58 or 60, the other XOR gate input being the inverted form of a sum input TSC or TSD. The AND gates 60 or 62 have as one input the intermediate carry signal CIC/ or CID/ and as the other input carry signal CMA/ or CMB/. The logic of the PA2 elements is also discussed in further detail below.

The NAND gate 64 is designated PAC, and generates the single carry output FCD from the circuit module, derived from intermediate carry signals CIE/ and CMC/, which are input to the NAND gate together with the inverted form of the third carry input TCD. The OR gates 50–55 serve to generate the intermediate carry signals CIB/, CIC/, CID/, CIE/, CMB/ and CMC/. Specifically, CIB/ is the inverse of the carry signal generated from the addition of TC and TSA, these two input signals being input in inverse form to OR gate 50, the output of which is CIB/. When TC and TSA are both "1", CIB/ has a zero state. OR gate 50 therefore functions basically as an AND gate, since both of its inputs must be "1" in order to generate a particular output state. The same is true of the other OR gates 51-55, but they are configured as OR gates to conform more closely with the CML implementation to be described.

OR gate 51 generates intermediate carry signal CIC/ by ORing together the inverse forms of inputs TC, TSA, and TSB. Thus, intermediate carry signal CIC will be in the "1" state only if CIB is a "1" and sum bit TSB is also a "1". Likewise, intermediate carry signal CID is generated by OR gate 52, using as inputs the inverse forms of signals TC, TSA, TSB and TSC. CID represents the intermediate carry generated only if CIC is a "1" and sum bit TSC is a "1". In the same manner, OR gate 54 combines the same inputs as OR gate 52, together with sum input TSD, to generate intermediate carry signal CIE as a "1" only if CID is "1" and TSD is a "1".

A composite carry signal for the "C" bit position is produced by ANDing together intermediate signal CIC/ and signal CMA/, which is obtained by inverting carry input TCB in inverter 68. The composite carry signal, which combines the intermediate carry signal CIC and the TCB input carry signal, is then combined with the input sum signal TSC in XOR gate 58. OR gates 53 and 55 generate signal CMB/, from inverted TCB and TSC signals, and signal CMC/, from inverted TCB, TSC and TSD signals., AND gate 62 is used to combine intermediate carry signals CID/ and CMB/, to derive a composite carry signal for input to XOR gate 59, from which output sum signal FSD is obtained. The remaining logic, including OR gates 54 and 55, and NAND gate 64, combines all of the input sum and carry signals to obtain a single carry signal FCD.

The following are the logic equations for the four-bit look-ahead adder:

CIA/=TC/

CIB/=TC/+TSA/

CIC/=TC/+TSA/+TSB/

CID/=TC/+TSA/+TSB/+TSC/

CIE/=TC/+TSA/+TSB/+TSC/+TSD/

CMA/=TCB/

CMB/=TCB/+TSC/

CMC/=TCB/+TSC/+TSD/

FSA=TSA/⊕CIA/

FSB=TSB/⊕CIB/

FSC=TSC/⊕(CIC/.CMA/)

FSD=TSD/⊕(CID/.CMB/)

FCD/=CIE/.CMC/.TCD/

Below are truth tables for the values of FSA through FSD for various input and intermediate carry values:

| CIA | TSA | FSA |
|---|---|---|

| CIB | TSB | FSB |
|---|---|---|
| 0 | 0 | 0 |
| 0 | 1 | 1 |
| 1 | 0 | 1 |
| 1 | 1 | 0 |

| CMA | CIC | TSC | FSC | |
|---|---|---|---|---|
| CMB | CID | TSD | FSD | |
| 0 | 0 | 0 | 0 | |
| 0 | 0 | 1 | 1 | |
| 0 | 1 | 0 | 1 | |
| 0 | 1 | 1 | 0 | |
| 1 | 0 | 0 | 1 | |
| 1 | 0 | 1 | 0 | |
| 1 | 1 | 0 | 1 | (not possible) |
| 1 | 1 | 1 | 0 | (not possible) |

To further illustrate operation of the circuit element designated PA2, suppose that neither CIC nor CMA is a "1". CIC will be a "1" only if an intermediate carry is generated into bit position C as a result of the values TC, TSA and TSB all being "1". If any of these three values is not a "1", the intermediate carry CIC will be a "0". Intermediate carry CMA will be a "0" only if carry input TCB is a "0". Since, in this example, both CIC and CMA are "0", the inverse values CIC/ and CMA/ input to AND gate 60 will both be "1" and the AND gate output will also be a "1". It will be seen that, with a "1" input from AND gate 60, XOR gate 58 transmits the input sum signal TSC unaltered. This is apparent from the first two lines of the truth table for the logic element PA2.

If either of the intermediate carry signals CIC and CMA is a "1", indicating a carry into bit position C, AND gate 60 will yield a "0" output signal, and the effect on XOR gate 58 is to invert the input sum bit TSC. This, of course, is consistent with the fact that an intermediate carry into bit position C will result in a change in the value of the sum bit at that position. This is apparent from the third through sixth lines of the truth table.

At first sight it would appear that the last two lines of the truth table for the PA2 element are in error, since the occurrence of two intermediate carries into the same bit position should surely not result in the inversion of the sum bit at that position. However, the condition in which both intermediate carry bits CIC and CMA are both "1" is an impossible one, since it would require TCB, TSA and TSB all to be in the "1" condition. The two-bit adder circuits in the first computational stage render this condition impossible.

Figure 6:
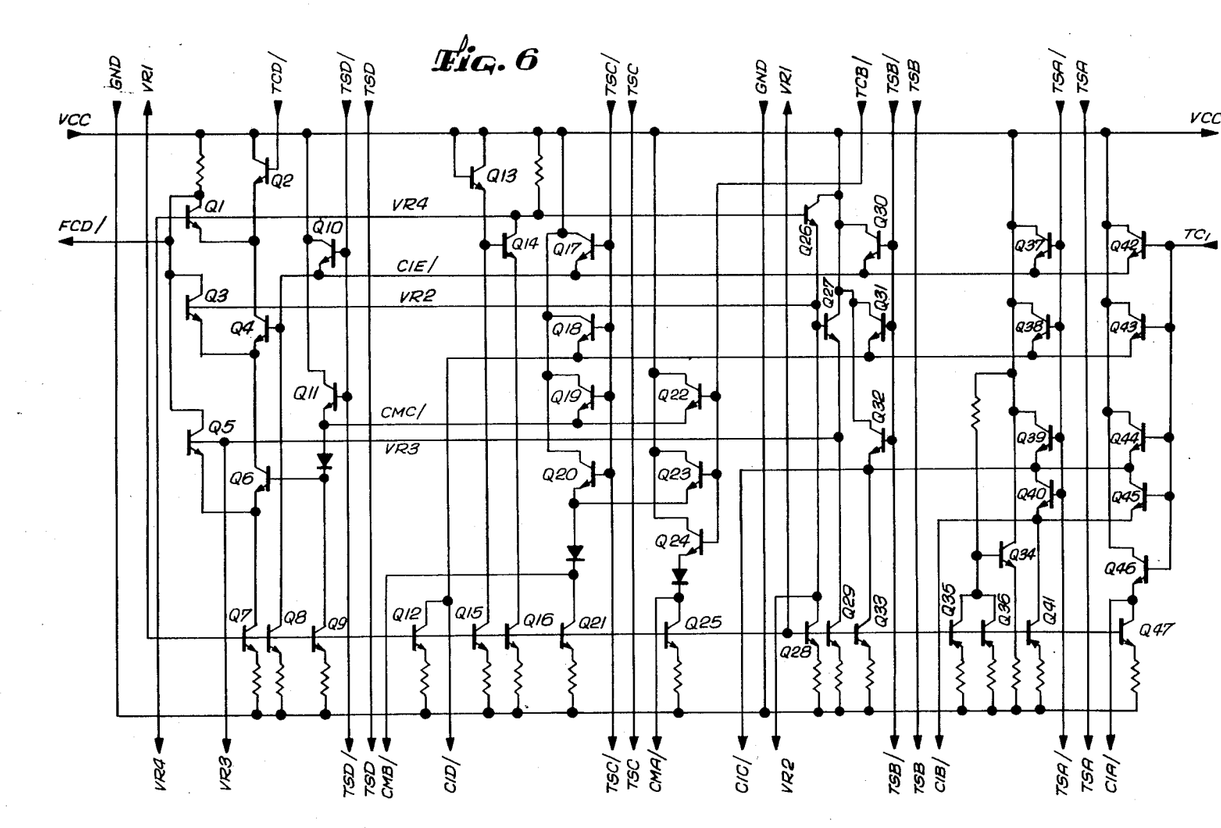
FIGS. 6, 7 and 8 together comprise a schematic diagram of the four-bit look-ahead adder of FIG. 4.

FIG. 6 shows the CML implementation all of the logic of FIG. 4 except that relating to the portions designated PA1 and PA2, i.e. exclusive XOR gates 56-59 and AND gates 60 and 62. The logic for the portion designated PA1 is implemented by CML circuitry shown in FIG. 7, and the portion designated PA2 is implemented as shown by the CML circuitry of FIG. 8. The current-mode logic is stacked in such a manner as to compute the necessary logical functions of the FIG. 4 logic in a single gate delay. Thus the required assimilation of carries in a three-to-one ratio is achieved in the single gate delay time, and the total time for the overall addition process is greatly reduced.

Specifically, one CML module, shown in FIG. 6, generates all of the intermediate carry signals, as well as the carry output FCD. For example, the inverse of the input carry signal TC is subject to a delay by the action of transistor Q46. When TC/ is in a high state, transistor Q46 conducts and CIA/ is also in the high state. The function of OR gate 50 is performed by transistors Q40 and Q45, which are rendered conductive by signals TSA/ and TC/, respectively. The other OR gates 51-55 can be recognized by tracing through the schematic from the output signal name to the transistor emitters to which the output signal is coupled. The base input circuits of these transistors are the OR gate inputs. For example, intermediate carry signal CIE/ is coupled to the emitters of transistors Q10, Q17, Q30, Q37 and Q42, which have their base terminals coupled respectively to TSD/, TSC/, TSB/, TSA/ and TC/. These will be recognized as the inputs to OR gate 54 in FIG. 4.

The function of NAND gate 64 is performed by transistors Q2, Q4 and Q6, which are connected in series and must all be conductive to generate a high-level signal FCD/. The FCD/ output is derived from the collector terminal of transistor Q1, which is paired with transistor Q2. Thus, when Q2 is conductive the signal level of FCD/ is raised to a higher level than the one persisting when Q2 is not conductive.

Figure 7:
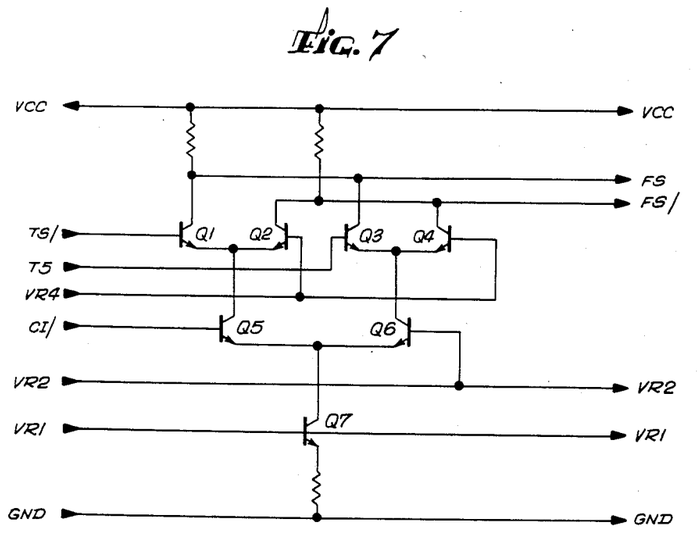

FIG. 7 shows the CML implementation of logic element PA1, i.e. XOR gates 56 and 57 in FIG. 4. When intermediate carry signal CIA/ or CIB/ is high, transistor Q5 is conductive and either Q1 or Q2 is conductive, depending on the state of input signal TSA or TSB. Output signal FSA or FSB then reflects the condition of input signal TSA or TSB. On the other hand, if intermediate carry signal CIA/ or CIB/ is low, only transistor Q6 is switched on and the output signal FSA or FSB then reflects the inverse of the input signal.

Figure 8:
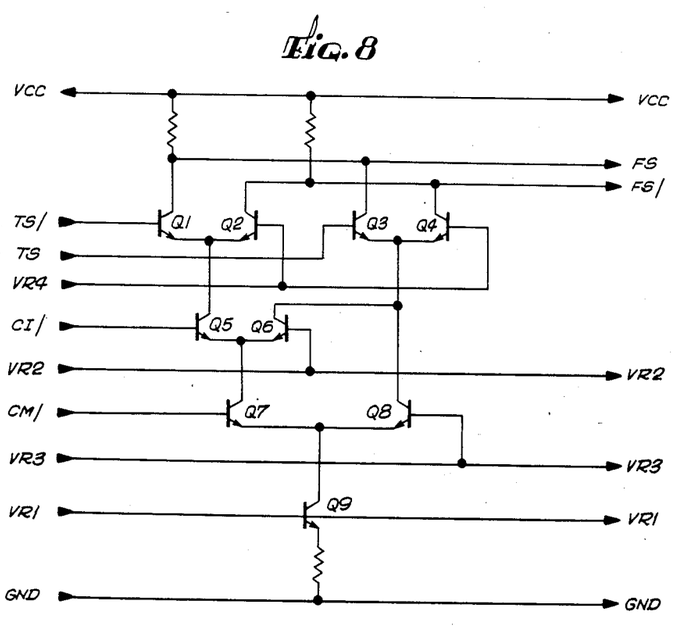

FIG. 8 shows the detailed implementation of the logic element PA2. Transistors Q1-Q4 perform the same function here as the same numbered elements in FIG. 7. For transistors Q1 and Q2 to be energized, both transistor Q5 and transistor Q7 must be switched on, which requires that both the CI/ signal and the CM/ signal be in a high condition. If either one is low, transistors Q3 and Q4 will control the state of the output signal, which will then be the inverse of the input signal.

It will be appreciated from the foregoing that the present invention represents a significant advance in the field of fast adder circuits. In particular, the invention provides a speed advantage over previous designs for pyramid carry adders. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. An adder circuit with high-speed carry assimilation capability, said circuit comprising:
    a first adder stage, including means for processing two multi-bit numbers to be added together, and producing an intermediate multi-bit sum output and a multi-bit carry output;
    at least one additional adder stage, including means for logically combining sum outputs and carry outputs from said first stage, to produce carry and sum output bits such that the number of carry bits is reduced by a factor of at least three;
    means for coupling the intermediate carry output bits and the intermediate sum output bits from said first adder stage to said additional adder stage;
    wherein said first adder stage includes a plurality of two-bit adder modules, each of which produces a two-bit intermediate sum output and a single carry output bit;
    and wherein said additional adder stage is a second stage, and includes a plurality of second-stage adder modules, each of which receives the carry outputs of at least three of said two-bit adders in said first adder stage, and produces as outputs a set of intermediate sum bits and a single carry bit.

2. An adder circuit as set forth in claim 1, wherein:
    said first and second adder stages are implemented in current-mode logic, to provide a reduced processing delay at each of said stages.

3. An adder circuit as set forth in claim 1, wherein:
    said second adder stage receives four sum input bits and three intermediate carry bits, and produces four sum output bits and one carry output bit.

4. A high-speed adder circuit, comprising:
    a first adder stage for processing two multi-bit numbers to be added together, said first adder stage including a plurality of two-bit adder modules, each of which produces a two-bit sum output and a single carry bit output;
    at least one additional adder stage including a plurality of second-stage adder modules, each of which includes means for processing n carry bits and $2(n-1)$ sum bits output by said two-bit adder modules, where n is at least three, and means for logically combining the sum and carry inputs to produce one carry output and $2(n-1)$ sum outputs; and
    means for coupling the carry output bits and the sum output bits from said first adder stage to said additional adder stage.

5. A high-speed adder circuit as set forth in claim 4, wherein said means for logically combining the sum and carry inputs includes:
    a first set of parallel current-mode logic circuits, for generating from the sum and carry input signals a plurality of intermediate carry signals; and
    a second set of parallel current-mode logic circuits, for generating the sum output signals and the carry output signal from the sum input signals and the intermediate carry signals.

6. A high-speed adder circuit as set forth in claim 5, wherein:
    each of the two-bit adder modules in said first adder stage includes a current-mode logic circuit for generating a two-bit sum output and a single carry bit output.

* * * * *